(12) United States Patent
Cornick et al.

(10) Patent No.: US 9,721,078 B2
(45) Date of Patent: Aug. 1, 2017

(54) SYSTEM AND METHOD FOR USER ENROLLMENT IN A SECURE BIOMETRIC VERIFICATION SYSTEM

(75) Inventors: Kenneth Cornick, New York, NY (US); Caryn Seidman-Becker, New York, NY (US)

(73) Assignee: Alclear LLC, New York, NY (US)

( * ) Notice: Subject to any disclaimer, the term of this patent is extended or adjusted under 35 U.S.C. 154(b) by 0 days.

(21) Appl. No.: 14/127,103

(22) PCT Filed: May 15, 2012

(86) PCT No.: PCT/US2012/037983
§ 371 (c)(1),
(2), (4) Date: May 16, 2014

(87) PCT Pub. No.: WO2013/002903
PCT Pub. Date: Jan. 3, 2013

(65) Prior Publication Data
US 2014/0289842 A1    Sep. 25, 2014

Related U.S. Application Data

(60) Provisional application No. 61/502,453, filed on Jun. 29, 2011.

(51) Int. Cl.
*G06F 21/32* (2013.01)
*H04L 9/32* (2006.01)

(52) U.S. Cl.
CPC .......... *G06F 21/32* (2013.01); *H04L 9/3231* (2013.01)

(58) Field of Classification Search
USPC .......... 726/19, 2, 21, 36; 713/150, 163, 181; 380/255, 264, 276
See application file for complete search history.

(56) References Cited

U.S. PATENT DOCUMENTS

| 2006/0213982 A1* | 9/2006 | Cannon et al. ............... 235/380 |
| 2007/0061590 A1* | 3/2007 | Boye et al. ................... 713/186 |
| 2008/0018451 A1 | 1/2008 | Slibeck et al. |
| 2008/0162943 A1* | 7/2008 | Ali et al. ...................... 713/185 |
| 2008/0178008 A1* | 7/2008 | Takahashi et al. ........... 713/186 |

(Continued)

OTHER PUBLICATIONS

Manson, Thomas M.; Biometrics at the Airport; Hendon Publishing Company; Archived Internet Article retrieved Mar. 31, 2017; http://ww.hendonpub.com/resources/article_archive/results/details?id=2269.

(Continued)

*Primary Examiner* — Farid Homayounmehr
*Assistant Examiner* — Sharif E Ullah
(74) *Attorney, Agent, or Firm* — Locke Lord LLP; Scott D. Wofsy; Christopher J. Capelli

(57) ABSTRACT

A computer-implemented method and system for verifying the identity of a user in an identity authentication and biometric verification system which includes collecting information from the user regarding the user's identity, which is then electronically authenticated. Upon authentication, personal information regarding the verified identity of the user is retrieved from a source database which is used to verify the identity of the user, via user interaction. Upon successful verification and authentication, biometric data regarding the user is electronically collected.

9 Claims, 3 Drawing Sheets

(56) References Cited

U.S. PATENT DOCUMENTS

2009/0183008 A1* 7/2009 Jobmann ............... H04L 9/0866
713/186

OTHER PUBLICATIONS

Fly Through Airport Security, Web Clip; Internet archive wayback machine: http://web.archive.org; Sep. 27, 2007.
CLEAR; Clear Facts, Web Clip; https://web.archive.org/web/20051018162841/http://www.flyclear.com/clear_howclearworks.html; Oct. 18, 2005.
Clear—Enrollment Process, Web Clip; https://web.archive.org/web/20080705171343/http://flyclear.com/enrollment; Jul. 5, 2008.
Photo of Kiosk Device, 2008.

* cited by examiner

SYSTEM AND METHOD FOR USER ENROLLMENT IN A SECURE BIOMETRIC VERIFICATION SYSTEM

CROSS REFERENCE TO RELATED APPLICATIONS

This application claims priority to U.S. Patent Application Ser. No. 61/502,453 filed Jun. 29, 2011, which is incorporated herein by reference in its entirety.

FIELD OF THE INVENTION

The invention relates generally to a biometric verification system, and more specifically to a method and system for authenticating a user's identity.

BACKGROUND OF THE INVENTION

The present invention generally pertains to identity verification systems. More specifically, the present invention pertains to biometric security systems that provide an enhanced defense against fraudulent use of an individual's identity to complete a transaction.

Within a typical biometric security system, there are at least two operations, enrollment and verification. The operation of enrollment encompasses the original sampling of a person's biographic and biometric information, confirmation of the identity and its owner, and the creation and storage of a biometric template associated with the identity (a.k.a., an enrollment template) that is a data representation of the original sampling. The operation of verification includes an invocation of a biometric sample for the identification of a system user through comparison of a data representation of the biometric sample with one or more stored enrollment templates.

Biometric information is, by nature, reasonably public knowledge. A person's biometric data is often casually left behind or is easily seen and captured. This is true for all forms of biometric data including, but not limited to, fingerprints, iris features, facial features, and voice information. As an example, consider two friends meeting. The one friend recognizes the other by their face and other visible key characteristics. That information is public knowledge. However, a photo of that same person 'is' not that person. This issue similarly applies, electronically, to computer-based biometric authentication wherein a copy of authorized biometric information is susceptible to being submitted as a representation of the corresponding original information. In the context of biometric security applications, what is important, what enables a secure verification, is a unique and trusted invocation of an authorized biometric.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages and in accordance with the purpose of the invention, as embodied, the invention includes in one aspect a computer-implemented method for verifying the identity of a user in an identity authentication and biometric verification system. The method includes collecting information from the user regarding the user's identity (such as a passport), which is then electronically authenticated. Upon authentication, personal information regarding the verified identity of the user is retrieved from a source database, which is used to verify the user, via user interaction. Upon successful verification and authentication, biometric data regarding the user is electronically collected and matched to the personal information retrieved from the source database. Another aspect of the invention may include the functionality to perform scoring or qualification screening as well as providing a user with a token on a smart card device or via a cardless system.

In a further illustrated aspect of the invention, provided is an authentication and biometric verification system adapted to electronically couple to at least one electronic source database for authenticating the identity of a user. The system preferably includes a central processing system configured to receive information regarding the identity of a user and verifying the identity of the user based upon the received information. Upon successful verification, the central processing system is further configured to retrieve from at least one electronic source database information relating to the user verified identity to authenticate a user's identity via interaction with the user applicant. Further provided is a biometric collection device electronically coupled to the central processing system adapted and configured to collect biometric data from a user applicant upon successful authentication of the user applicant. A payload processor component is further preferably provided and electronically coupled to the central processing system adapted and configured to convert the collected user applicant biometric information into an electronic payload.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

It is to be appreciated that the embodiments of this invention as discussed below preferably include software algorithms, programs, and/or code residing on computer useable medium having control logic for enabling execution on a machine having a computer processor. The machine typically includes memory storage configured to provide output from execution of the computer algorithm or program. Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Figure 1:
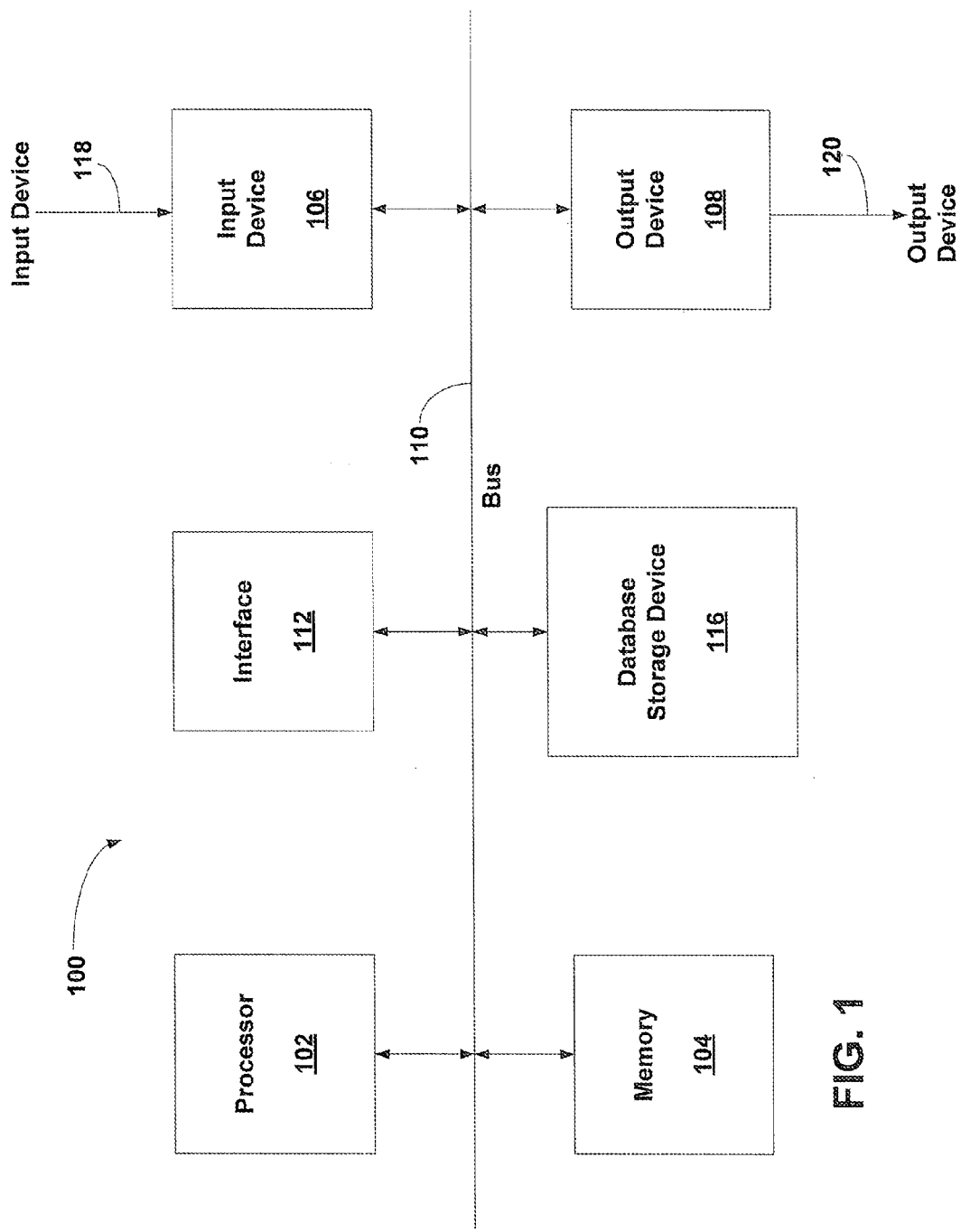
FIG. 1 is a system level diagram of a computering environment used by the present invention.

Turning now descriptively to the drawings, in which similar reference characters denote similar elements throughout the several views, FIG. 1 depicts an exemplary general-purpose computing system in which illustrated embodiments of the present invention may be implemented.

A generalized computering embodiment in which the present invention can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114, which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, tablet devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, reference is now made to FIG. 2 which depicts an illustrated embodiment of the system of the present invention, designated generally by reference numeral 200. With regards to system architecture 200, system 200 is to be understood to consist of two primary data processing environments: (i) a backend environment, which is generally a processing system and a database of records, and (ii) a customer service environment, which preferably contains only a subset of data required to service users 290 and applicant users on a day-to-day basis. As depicted in the illustrated embodiment of FIG. 2, all connections and interactions between the systems are understood to be handled through encrypted methods such as secure internet connections ("SSL"), virtual private networks ("VPN") and any other similar known, or unknown methods. Additionally firewalls may be used for added security protection. It is to be understood, in accordance with the illustrated embodiments, data in transit is preferably encrypted at all times.

Figure 2:
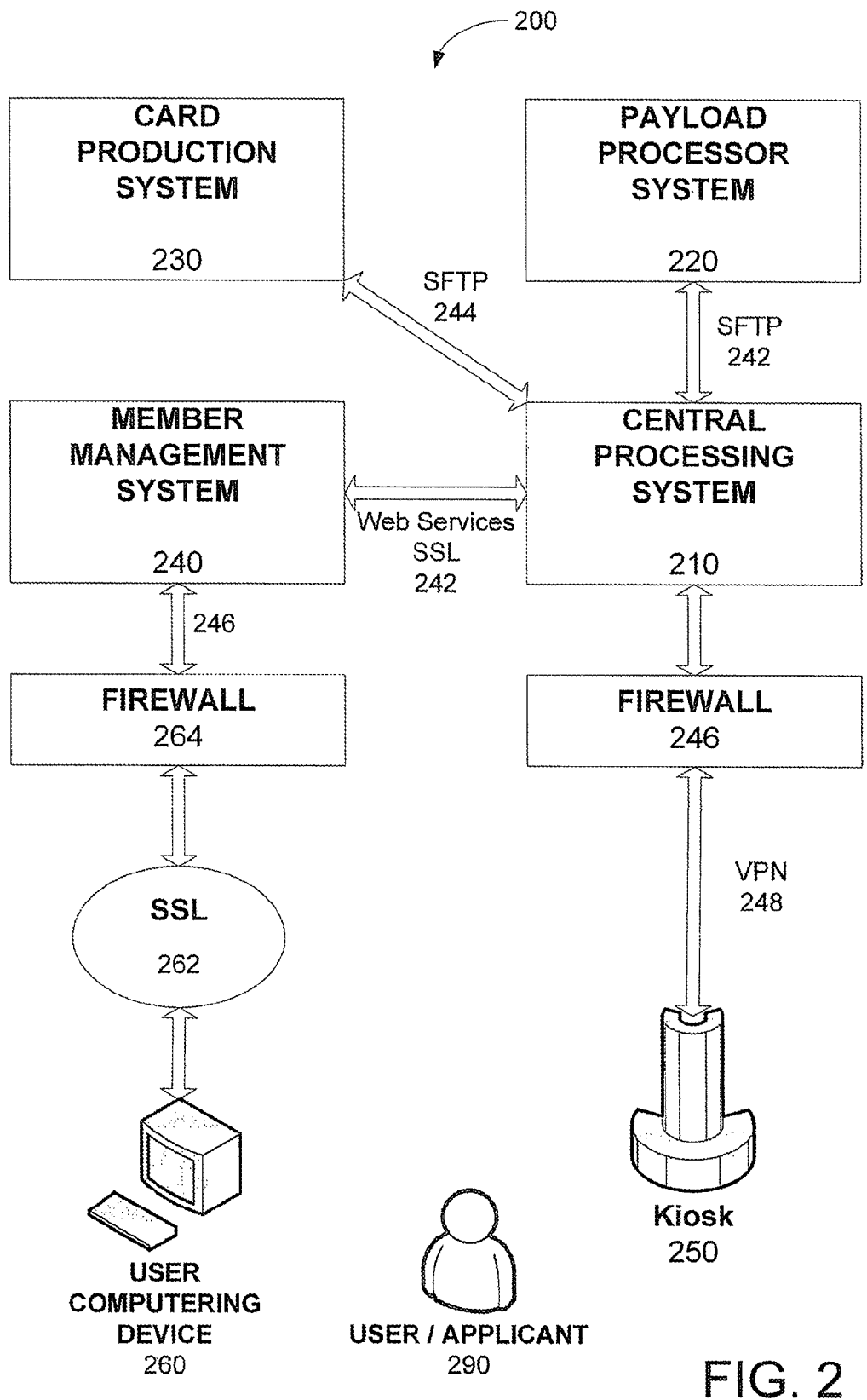
FIG. 2 is a system level diagram of components of the present invention in accordance with an illustrated embodiment.

In accordance with the illustrated embodiment of FIG. 2, system 200 preferably includes a central processing system 210 (preferably encompassing components of computering system 100) operative and configured to manage and protect the biographic and biometric information used to provision the services of the system 200 to Users 290 and "Benefit Providers". It is to be understood and appreciated the term "Benefit Providers", for purposes of the present invention, is to be understood to mean organizations that leverage the verification process described herein to confirm user identity in order to provide a product or service to a User 290. For example, CLEAR® is a service provider approved by the Transportation Security Administration (TSA) that performs biometric verification in order to provide the benefit of bypassing the traditional TSA Travel Document Checker (TDC). As discussed further below, central processing system 210 is preferably adapted and configured to communicate with third party data sources having information relevant, and preferably personal, to a user 290 so as to authenticate the user. An example of such a third party data source includes, but is not limited to, LexisNexis, and other similar data sources.

Central processing system 210 is electronically coupled to a payload processor system 220, a card production system 230 and member management system 240, each preferably encompassing components of computering system 100. Briefly, payload processor system 220 is operative and configured to convert User 290 biographic and biometric information into an electronic payload that can be loaded onto a smart card or other identity confirmation token for use in verification processes. Card production system 230 is operative and configured to create smart cards or other tokens containing the User 290 payload. And member management system 240 is operative and configured to manage User 290 information and transactions such as biographic data updates (change of address, phone number, email, etc. . . . ) as well as billing information and transactions. The member management system 240 may also provide information regarding usage and benefits.

It is to be appreciated and understood by one skilled in the art, the central processing system 210 is configured and operative to transmit data with each of the payload processor system 220, the card production system 230 and member management system 240 through any known suitable means. In the illustrated embodiment of FIG. 2, an encrypted transmission method such as Secure File Transfer Protocol (SFTP) or Secure Socket Layer (SSL) (242, 244, 246) is employed to transmit data between the central processing system 210, the payload processing system 220, the card production system 230, and the member management system 240. While the illustrated embodiment of the invention depicts a cryptographic Secure Sockets Layer (SSL) 246 to transmit data between the central processing system and the member management system 240 (the SSL 246 is to be understood to be only an exemplary method for transmitting data as any suitable method may be utilized).

In accordance with the illustrated embodiment of FIG. 2, system 200 further includes a plurality of kiosk devices 250 disposed in differing geographic locations (such as airports, but not limited thereto) for enabling enrollment and identity verification, as discussed further below. For the purposes of the present invention, each kiosk device 250 is to be understood to be an electronic kiosk (or computer kiosk or interactive kiosk) housing a computer terminal preferably employing software configured to enable the required user 290 enrollment and verification functionality while preventing users 290 from accessing system functions. It is to be appreciated and understood each computerized kiosk 250 communicates with the central processing system 210. Each kiosk 250 may be configured and operational to include biometric capture devices (such as fingerprint and/or iris capture devices, camera(s), card readers(s), trackballs, computer keyboards, pushbuttons and other typical input devices associated with interactive computer kiosks).

It is to be appreciated and understood by one skilled in the art, each kiosk 250 electronically communicates with the central processing system 210 using any known and suitable secure electronic method. In the illustrated embodiment of FIG. 2, a Virtual Private Network (VPN) link 248 is established between each kiosk 250 and the central processing system 210, preferably through a firewall 246. Input devices that communicate with the kiosk 250 can be physically attached to the kiosk 250 or remotely communicating with the kiosk 250 to provide the information needed to perform enrollment or verification functions.

To aid the enrollment process, system 200 is further configured and operative to couple to third party computering devices 260 accessible by a user 290 for enrollment purposes, as further explained below. It is to be appreciated and understood by one skilled in the art, each third party computing device 260 (e.g., a desktop or laptop computer, tablet device, smart phone, etc.) electronically communicates with the member management system 240 using any known and suitable secure electronic method. In the illustrated embodiment of FIG. 2, each third party computing device 260 electronically communicates with the member management system 240 via an internet Secure Sockets Layer (SSL) connection 262, preferably through a firewall 264.

It is to be appreciated and understood system 200 is preferably operative and configured to maintain remote monitoring capability of its field located kiosks 250 whereby monitoring and measuring of system performance and metrics will provide the information necessary for system 200 to continually evaluate the performance and effectiveness of all components of system 200. It is to be further appreciated and understood, data relating to an applicant, member, and/or potential member 290 is not to be stored locally at a kiosk 250. That is, no personally identifiable information is stored in kiosks 250 or any other field storage devices associated with system 200 (e.g., laptops). Additionally, it is to be understood and appreciated, system 200 utilizes the aforesaid encryption such as SFTP, SSL, and VPN connections, along with protection by Firewalls, to ensure the security of data in system 200.

With the system 200 in accordance with the illustrated embodiments of FIGS. 1 and 2 being described above, its method and process of operation will now be described in accordance with the illustrated diagrams of FIGS. 3 and 4 (with continuing reference to FIGS. 1 and 2). First, with reference to FIG. 3 an exemplary enrollment process for an applicant user 290 with system 200 will be described.

Starting at step 310, a user first preferably provides the appropriate enrollment payment information and user background/demographic information to system 200. This information is preferably input to the member management system 240. It is to be appreciated this information may be input to the member management system 240 from a user, via a user computering device 260 or a system kiosk 250 as illustrated in FIG. 2. In particular, the user computering device 260 preferably couples to the member management system 240 using an internet address coupling (e.g., www.clearme.com), which coupling is preferably an SSL internet 262 coupled connection, through firewall(s) 264, providing a secure and encrypted coupling.

Next, at step 320 the member management system 240 is configured and operative to store the aforesaid user payment and billing information along with the user's background and demographic information necessary for membership information and verification purposes. The remaining portion of the user 290 input information from step 310 is preferably transmitted to the central processing system 210. It is also to be appreciated that if a kiosk 250 is used for user enrollment purposes, the user's 290 input enrollment information is preferably transmitted to the central processing system 210, which in turns sends user billing/payment information and other appropriate membership information to the member management system 240 for storage therein.

Next, to complete the enrollment process, a user 290 is preferably present at a kiosk 250 (or user computering device 260) whereby the central processing system 210 is configured and operative to send user demographic information to the kiosk 250 the user is present at, preferably in real-time, so as to be authenticated by a user 290 preferably in the presence of a system attendant for user authentication (step 330). That is, this is the process whereby the user's identity is authenticated via data collected from external sources such as a passport, drivers license (and the like) and the successful completion of answers to questions which are specific to the user, as set forth above. Upon such user authentication, the kiosk 250 is preferably configured and operative to scan and authorize certain user documentation to authenticate the user 290 (step 340). For instance, each kiosk 250 may be configured and operative to only accept those forms of identification that Benefit Providers such as the TSA has deemed acceptable and that can be authenticated.

As an additional measure of security for verifying the identity of an enrolling user 290, system 200 is configured and operative to perform an authentication user test (step 330). As mentioned above, once the identity of the user applicant is authenticated (step 320), the central processing system 210 is preferably adapted and configured to communicate with a remote third party data source (e.g., Lexis Nexis) to retrieve data relevant and personal to the verified identity of the user applicant 290. This data (e.g., the amount of a mortgage or automobile payment), is used by central processing system 210 to authenticate the user applicant 290 so as to mitigate any instance of identity theft, as now discussed below.

In a preferred embodiment, the aforesaid retrieved authenticating data is utilized by system 200 to formulate a quiz/test using the aforesaid retrieved authenticating data (e.g., the amount of a mortgage payment). It is to be appreciated and understood the functionality of the aforesaid authentication user test (step 330) is to strengthen the individual authentication and enrollment requirements and further decrease an imposter's ability to enroll under an alias. For instance, a question presented may be the amount of the user's monthly mortgage payment and/or identify the most recent user employers. Thus, with regards to the aforementioned authentication user test (step 330), system 200 has incorporated an additional step in the secure member enrollment process. That is, system 200 has made the successful "in-person" completion of an identity authentication test, (i.e. a personalized questionnaire populated by commercially available data) as an additional eligibility requirement. In one embodiment, the identity authentication test consists of posing applicants randomized questions plus an auxiliary question. To successfully complete the quiz, an applicant user 290 preferably answers a predetermined number of questions correctly during a limited time period while being observed by an enrollment specialist. If an applicant/user 290 does not properly respond to the randomized questions and successfully complete the quiz, the applicant/user 290 is preferably not permitted to complete the enrollment process.

Upon the successful authentication of the applicant user's 290 identity documents and the passing of the aforesaid identity authentication test (step 330), each kiosk 250 is additionally preferably configured and operative to collect user biometric information (e.g., fingerprints, retain/iris scan, facial image, voice and the like) (step 340).

The collected applicant/user 290 biometric information (step 340) is provided to the payload processor system 220 (step 360). Which payload processor system 220 formats a user 290 biometric template based upon the user's collected biometric information (step 340) which is then sent to the central processing system 210 (step 350). The user 290 biometric template is then preferably sent from the central processing system 210 to the card production system 230 which produces a user identification token such as a smartcard having embedded or links to user biometric and biographic information using any known means (smart chip, magnetically or optically encoded information and the like) (step 360). The user identification token may then be issued to a user 290 for use thereof (step 370). It is to be understood and appreciated the invention is not to be understood to be limited to the use of such a user issued token residing on a smart card or like device but rather may encompass matching a user's retrieved biometric information with that previously stored in system 200.

Figures 3, 4:
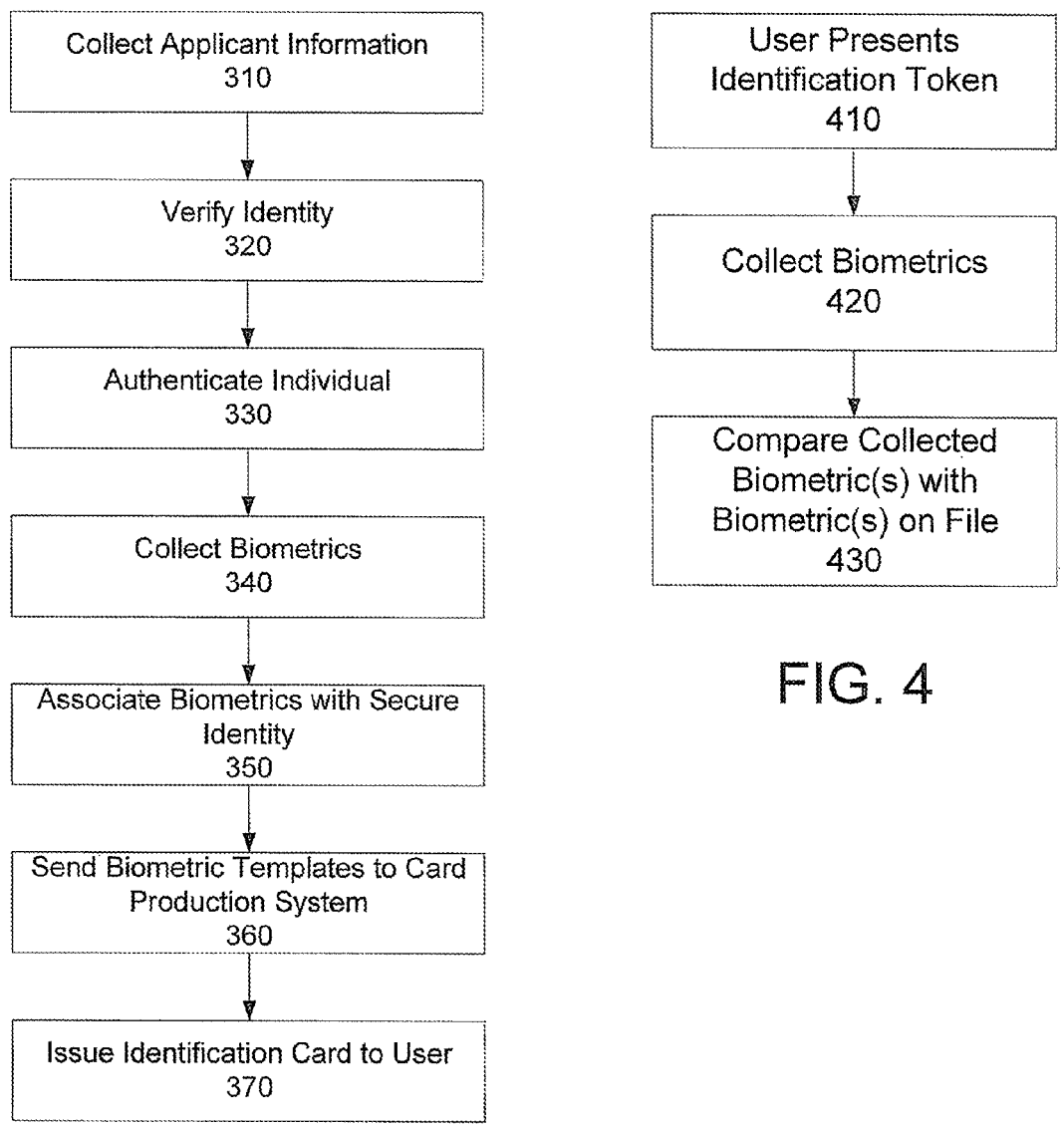
FIGS. 3 and 4 are flow charts depicting operation of the present invention in accordance with the illustrated embodiment of FIG. 2.

With reference now to FIG. 4, the process for user 290 use of the aforesaid user identification token will now be briefly discussed. Starting at step 410, an enrolled user 290 presents the user identification token to a kiosk 250 associated with a third party requiring identity verification of the user 290 (e.g., airport security, admittance to an event requiring heightened security, or to a merchant desiring to verify a client remitting payment using a credit card or other ACH type of payment). Next, the kiosk 250 is configured and operative to confirm a biometric match between biometric data stored for the user 290 on the user identification token or in the central processing system 210 and the matching biometric features of the user 290 collected at the time of verification (step 420). If there is a match, the user's identity is verified and authenticated (step 430).

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. For instance, while the above illustrated embodiments make reference to a user token dedicated for use of a user's identification in an airport environment, other embodiments encompass using a token dedicated for another purpose such as a credit or debit card which incorporates the biometric authentication features mentioned above, along with the aforesaid secure enrollment process (FIG. 3).

The above presents a description of a best mode contemplated for carrying out the present invention identity authentication and biometric verification system and method, and of the manner and process of making and using the identity authentication and biometric verification system and method, in such full, clear, concise, and exact terms as to enable any person skilled in the art to which it pertains to make and use these devices and methods. The present invention identity authentication and biometric verification system and method is, however, susceptible to modifications and alternative method steps from those discussed above that are fully equivalent. Consequently, the present invention identity authentication and biometric verification system and method is not limited to the particular embodiments disclosed. On the contrary, the present invention identity authentication and biometric verification system and method encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A computer-implemented method for verifying the identity of a user applicant in an identity authentication and biometric verification system using a kiosk device, comprising the steps of:

inputting information, by a first input component provided by the kiosk device, regarding at least the identity of the user applicant;

electronically scanning, by a second input scanning component provided by the kiosk device, one or more documents to verify the identity of the user applicant based upon information captured from the first input component;

electronically retrieving from at least one electronic third party database, after the user applicant identity has been verified, information relating to the user applicant's verified identity and presenting the information retrieved from the third party database to the user applicant in the form of a question soliciting an answer relevant to the retrieved information;

authenticating a user's identity in a computer processor by analysis of the answer to the question presented to the user applicant regarding the information retrieved from the at least one electronic third party database; and upon successful authentication of the user applicant, electronically collecting biometric data by a third input biometric component provided in the kiosk device and generating an identification token containing the user applicant's collected biometric data.

2. A computer-implemented method for verifying the identity of a user as recited in claim 1 wherein the authenticating step includes using at least the information retrieved from the at least one electronic source database to perform an identity test to be taken by the user applicant.

3. A computer-implemented method for verifying the identity of a user as recited in claim 1 wherein the at least one electronic source database is associated with a third party.

4. A computer-implemented method for verifying the identity of a user as recited in claim 1 wherein the third party is LexisNexis.

5. A computer-implemented method for verifying the identity of a user as recited in claim 1 wherein the electronically collecting information step includes the user applicant inputting identity information.

6. A computer-implemented method for verifying the identity of a user as recited in claim 5 wherein user applicant identity information is electronically scanned.

7. A computer-implemented method for verifying the identity of a user as recited in claim 1 wherein the electronically collecting biometric data includes scanning a user applicant's fingerprint.

8. A computer-implemented method for verifying the identity of a user as recited in claim 1 further including the step of embedding the generated identification token on a tangible medium.

9. A computerized kiosk device configured for verifying the identity of a user applicant, comprising:

a computer processor;

a biometric input component;

a keyboard input component coupled to the computer processor for inputting the identity of the user applicant;

a document scanning component coupled to the computer processor for scanning one or more user applicant provided documents whereby the computer processor verifies the identity of the user applicant based upon information captured from the scanned one or more documents, whereby the computer processor is instructed to:

electronically retrieve from at least one electronic third party database, after the user applicant identity has been verified, information relating to the user applicant's verified identity and presenting the information retrieved from the third party database to the user applicant in the form of a question soliciting an answer relevant to the retrieved information;

authenticate the user applicant's identity by analysis of the answer to the question presented to the user applicant regarding the information retrieved from the at least one electronic third party database; and upon successful authentication of the user applicant, collect biometric data from the user applicant, by the biometric component and generate an identification token containing the user applicant's biometric data to be utilized in future authentication procedures regarding the user applicant.

\* \* \* \* \*

UNITED STATES PATENT AND TRADEMARK OFFICE
CERTIFICATE OF CORRECTION

PATENT NO. : 9,721,078 B2
APPLICATION NO. : 14/127103
DATED : August 1, 2017
INVENTOR(S) : Cornick et al.

It is certified that error appears in the above-identified patent and that said Letters Patent is hereby corrected as shown below:

In the Claims

In Column 10, at Line 52, Claim 1 delete "the" and insert --an--.

In Column 10, at Line 65, Claim 1 after "the," insert --identity of the--.

In Column 10, at Line 65, Claim 1 delete "identity.".

In Column 10, at Line 66, Claim 1 delete "user applicant's.".

In Column 10, at Line 67, Claim 1 after "identity," insert --of the user applicant--.

In Column 11, at Line 1, Claim 1 after "from the," insert --at least one electronic--.

In Column 11, at Line 2, Claim 1 delete "the" and insert --a--.

In Column 11, at Line 4, Claim 1 delete "a user's," and insert --the--.

In Column 11, at Line 4, Claim 1 after "identity," insert --of the user applicant--.

In Column 11, at Line 8, Claim 1 after "the," insert --identity of the--.

In Column 11, Line 11, Claim 1 delete "user.".

In Column 11, Line 12, Claim 1 delete "applicant's.".

In Column 11, Line 14, Claim 2 delete "a" and insert --the--.

In Column 11, Line 14, Claim 2 after "user", insert --applicant--.

Signed and Sealed this
Tenth Day of July, 2018

Andrei Iancu
*Director of the United States Patent and Trademark Office*

CERTIFICATE OF CORRECTION (continued)
U.S. Pat. No. 9,721,078 B2

In Column 11, Line 16, Claim 2 delete "source" and insert --third party--.

In Column 11, Line 19, Claim 3 delete "a" and insert --the--.

In Column 11, Line 19, Claim 3 after "user," insert --applicant--.

In Column 11, Line 20, Claim 3 delete "source" and insert --third party--.

In Column 11, Line 23, Claim 4 delete "a" and insert --the--.

In Column 11, Line 23, Claim 4 after "user," insert --applicant--.

In Column 11, Line 23, Claim 4 delete "1" and insert --3--.

In Column 11, Line 26, Claim 5 delete "a" and insert --the--.

In Column 11, Line 26, Claim 5 after "user," insert --applicant--.

In Column 11, Line 26, Claim 5 delete "electronically.".

In Column 11, Line 27, Claim 5 delete "collecting" and insert --inputting--.

In Column 11, Line 30, Claim 6 delete "a" and insert --the--.

In Column 11, Line 30, Claim 6 after "user," insert --applicant--.

In Column 11, Line 30, Claim 6 delete "user applicant" and insert --the--.

In Column 11, Line 33, Claim 7 delete "a" and insert --the--.

In Column 11, Line 33, Claim 7 after "user," insert --applicant--.

In Column 11, Line 34, Claim 7 delete "a user applicant's fingerprint" and insert --a fingerprint of the user applicant--.

In Column 12, Line 2, Claim 8 delete "a" and insert --the--.

In Column 12, Line 2, Claim 8 after "user," insert --applicant--.

In Column 12, Line 2, Claim 8 delete "the" and insert --a--.

In Column 12, Line 6, Claim 9 delete "the" and insert --an--.

In Column 12, Line 13, Claim 9 delete "user applicant.".

In Column 12, Line 14, Claim 9 delete "provided.".

CERTIFICATE OF CORRECTION (continued)
U.S. Pat. No. 9,721,078 B2

In Column 12, Line 20, Claim 9 delete "user applicant.".

In Column 12, Line 20, Claim 9 after "identity," insert --of the user applicant--.

In Column 12, Line 21, Claim 9 delete "user applicant's.".

In Column 12, Line 22, Claim 9 after "identity," insert --of the user applicant--.

In Column 12, Line 23, Claim 9 after "from the," insert --at least one electronic--.

In Column 12, Line 24, Claim 9 delete "the" and insert --a--.

In Column 12, Line 26, Claim 9 after "the," insert --identity of the--.

In Column 12, Line 26, Claim 9 delete "applicant's identity" and insert --applicant--.

In Column 12, Line 32, Claim 9 after "biometric," insert --input--.

In Column 12, Line 33, Claim 9 delete "user applicant's.".